US008806862B2

(12) United States Patent
Harsia

(10) Patent No.: US 8,806,862 B2
(45) Date of Patent: Aug. 19, 2014

(54) SMART FLOW SHARING SYSTEM

(75) Inventor: Jarmo Antero Harsia, Lincolnshire, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 1051 days.

(21) Appl. No.: 12/317,029

(22) Filed: Dec. 18, 2008

(65) Prior Publication Data

US 2009/0158728 A1 Jun. 25, 2009

Related U.S. Application Data

(60) Provisional application No. 61/015,463, filed on Dec. 20, 2007.

(51) Int. Cl.
*F16D 31/02* (2006.01)

(52) U.S. Cl.
USPC .................................. 60/422; 60/484; 60/486

(58) Field of Classification Search
USPC .................... 60/421, 422, 428, 429, 484, 486
See application file for complete search history.

(56) References Cited

U.S. PATENT DOCUMENTS

| | | | | |
|---|---|---|---|---|
| 4,002,220 | A | 1/1977 | Wible | |
| 4,116,001 | A | 9/1978 | Orth | |
| 4,147,034 | A | 4/1979 | Johnson | |
| 4,192,337 | A | 3/1980 | Alderson et al. | |
| 4,337,620 | A | 7/1982 | Johnson | |
| 4,470,260 | A | 9/1984 | Miller et al. | |
| 4,514,147 | A | 4/1985 | Borman et al. | |
| 4,552,168 | A | 11/1985 | Chatterjea | |
| 4,561,341 | A * | 12/1985 | Aikawa | 60/484 |
| 4,573,319 | A | 3/1986 | Chichester | |
| 4,712,375 | A | 12/1987 | Kauss et al. | |
| 4,723,409 | A | 2/1988 | Kühn | |
| 4,866,936 | A | 9/1989 | Ohashi et al. | |
| 5,490,384 | A | 2/1996 | Lunzman | |
| 5,673,557 | A * | 10/1997 | Yoshida et al. | 60/422 |
| 5,722,190 | A | 3/1998 | Arnold | |
| 6,023,134 | A | 2/2000 | Carl | |
| 6,047,545 | A | 4/2000 | Deininger | |
| 6,290,474 | B1 | 9/2001 | Bavendiek et al. | |
| 6,810,663 | B2 * | 11/2004 | Konishi et al. | 60/422 |
| 7,155,907 | B2 | 1/2007 | Desjardins et al. | |
| 7,251,934 | B2 | 8/2007 | Lech et al. | |

* cited by examiner

*Primary Examiner* — Michael Leslie
(74) *Attorney, Agent, or Firm* — Renner, Otto, Boisselle & Sklar, LLP

(57) ABSTRACT

A smart flow sharing system, useful in hydraulic systems having more than one hydraulically demanding equipment function wherein more than one of the hydraulically demanding functions are sometimes activated at the same time, has modified hydraulic passages and at least two fixed displacement pumps. The system automatically prioritizes hydraulic fluid flow so that when only one of two hydraulically demanding functions is activated by an operator, it receives the hydraulic fluid flow from both fixed displacement pumps, but when both hydraulically demanding functions are activated, one of the functions receives hydraulic fluid flow from the first fixed displacement pump, and the other function separately receives hydraulic fluid flow from the second fixed displacement pump. The smart flow sharing system accomplishes the foregoing without resorting to complex hydraulics or expensive additional components. An equipment operator advantageously achieves superior controllability and quicker movement of equipment functions using the invention.

20 Claims, 4 Drawing Sheets

SMART FLOW SHARING SYSTEM

CROSS-REFERENCE TO RELATED APPLICATIONS

This application claims priority from and is related to the following prior application: Smart Flow Sharing System, U.S. Provisional Application No. 61/015,463, filed Dec. 20, 2007. The prior application, including the entire written description and drawings figures, is hereby incorporated by reference into the present application.

BACKGROUND OF THE INVENTION

1. Field of the Invention

The present invention relates to hydraulic valve systems used, for example, in off-road earth moving, construction, and forestry equipment, such as rough terrain forklifts (also known as telehandlers), earth movers, backhoes, articulated booms, and the like. Hydraulic valve systems are utilized, for example, to cause pistons to lower, lift, extend, retract, lock, unlock, or angle a fork in a telehandler. The present invention relates to an improved design for such hydraulic valve systems.

2. Brief Description of the Related Art

Prior art hydraulic valve systems include the open center hydraulic valve system 110 illustrated in FIG. 1. The open center hydraulic valve system 110 in FIG. 1 is illustrated in a hydraulic circuit diagram in schematic form as would be understood by a skilled practitioner. The open center hydraulic valve system 110 of FIG. 1 presently is in common use, for example, in off-road earth moving, construction, and forestry equipment, such as telehandlers. FIG. 1 illustrates an example of an open center hydraulic valve system 110 for a telehandler.

While variations in the basic design of such a prior art open center hydraulic valve system 110 exist, the fundamental components and operation of such a system are briefly described below.

The prior art open center hydraulic valve system 110 of FIG. 1 typically includes one or more hydraulic fluid tanks 112, one or more constant flow open center hydraulic valve banks ("valves") 114, and a fixed displacement pump 116 run by a motor 150 and driven by a motor shaft 152. (While the hydraulic fluid tanks 112 are illustrated in FIGS. 1-4 in multiple locations in the schematic illustrations for purposes of simplifying the illustration, skilled practitioners would recognize that the multiple illustrated locations of the hydraulic fluid tanks 112 in the schematics in FIGS. 1-4 would preferably constitute a single hydraulic fluid tank 112, or a system of hydraulically interconnected hydraulic fluid tanks 112, in actual operation). FIG. 1 illustrates a hydraulic system having one valve 114. For ease of reference, the valve 114 is separated into blocks A-F.

The valve 114, in turn, may include one or more spools 118, with each spool 118 being activated by spool actuators 120. The spool actuators 120 may be activated by an equipment operator using a number of known means, such as mechanically (for example, using a lever), electrically (for example, using a solenoid receiving an electrical signal from a switch, a joystick, a computer, or other means), electro-hydraulically, hydraulically, pneumatically, or otherwise. In the example illustrated in FIG. 1, the spools 118 in blocks B and C of valve 114 are activated by using electro-hydraulic valves 180, and the spools 118 in blocks D and E of valve 114 are activated by using a two-axis joystick 182.

In order to more understandably illustrate the operation of a spool 118 to selectively interconnect hydraulic pathways within a valve 114, a simplified drawing illustrating how a spool 118 of a simple prior art constant flow open center valve 114 is capable of redirecting the constant flow of hydraulic fluid is provided in FIG. 2. In the simplified drawing of FIG. 2, the well-known means of activating the spools 118 are omitted from the schematic diagram. Also omitted in FIG. 2 are ancillary hydraulic systems, such as the steering system 184 (including the steering/brake priority spool 186) and the brake system 188 (including the brake accumulator charge 190), which use relatively small amounts of hydraulic fluid flow/pressure compared to the remaining hydraulic functions, and the discussion of which is not pertinent to the invention herein.

In each of the blocks of the valve 114 illustrated in FIGS. 1 and 2, each spool 118 is capable of providing selective hydraulic communication with either one of a pair of associated hydraulic ports 122 and 124, depending upon the position of spool 118. The hydraulic ports 122 and 124 are hydraulically connected to a cylinder 126 on opposite sides of a piston 128. Each spool 118 has a number of internal hydraulic pathways which permit the spool 118, depending on its position, to direct hydraulic fluid flow to or from hydraulic ports 122 and 124, or to remain in a neutral (non-actuated) position wherein hydraulic fluid is permitted to flow unrestricted through the spool 118 through open center core 130.

Referring once again to the prior art open center hydraulic valve system 110 illustrated in FIGS. 1 and 2, each spool 118 is capable of selective hydraulic communication with a pair of associated hydraulic ports 122 and 124. Each pair of hydraulic ports 122 and 124, in turn, may be hydraulically connected to equipment applications in which the open center hydraulic valve system 110 is used to operate, typically utilizing a cylinder 126 and a piston 128. The hydraulic ports 122 and 124 selectively provide pressurized hydraulic flow to or from the cylinder 126 on opposite sides of the piston 128, thereby causing the piston 128 to move, and the application associated with the piston 128 to operate.

Referring again to FIGS. 1 and 2, each spool 118 of the valve 114, and, hence, each pair of hydraulic ports 122 and 124 associated with each spool 118, is associated with a function of the application on the equipment within which the open center hydraulic valve system 110 is utilized. In the example illustrated in FIG. 1, each one of the spools 118 (and the pair of hydraulic ports 122 and 124 associated with each spool 118) is associated with a block (indicated by a letter) in the valve 114, with each block, in turn, being associated with each of the following functions, which can be found, for example, in a telehandler: fork angle adjustment (block B), fork lock (block C), fork lift (block D), and fork extension (block E). Those functions are chosen for purposes of illustration, and, as would be recognized by skilled practitioners, those functions can vary, depending on the equipment and applications to which the open center hydraulic valve system 110 is assigned.

The valve 114 includes several hydraulic fluid pathways that may be selectively interconnected by activation of the spool 118, including an open center core 130, a power core 138, and a tank galley 132. The fixed displacement pump 116 pumps hydraulic fluid (at a constant flow rate for a given speed of the motor 150) from the hydraulic fluid tank 112 into the open center core 130. The tank galley 132 returns hydraulic fluid to the hydraulic fluid tank 112, where it is available to be re-pumped. The valve 114 also includes a hydraulic connection between the open center core 130 and the power core 138, namely, an open center/power core passage 140, upstream of the spools 118. (As commonly used, and as used herein, "upstream" shall mean in the direction towards a pump, "downstream" shall mean in the direction away from a pump). Typically, the valve 114 may also include smaller internal valves utilized to prevent, for example, overpressure or incorrect flow direction in the system, such as relief valves 142, or load drop check valves 144, which are not material to the explanation of the prior art or the invention.

The prior art open center hydraulic valve system 110 is typically housed in a standard manifold (not illustrated) attached to the equipment in which the open center hydraulic valve system 110 is being used. The fixed displacement pump 116 is typically driven by a motor 150, powered by a source such as by a power take-off (not illustrated), which, in turn, may be is directly mounted to a transmission (not illustrated), which, in turn, may be connected to the prime mover of the equipment in which the prior art open center hydraulic valve system 110 is being used.

The operation of the spools 118 in the valve 114 to direct hydraulic fluid flow to and to permit fluid flow from associated hydraulic ports 122 and 124 to cause, for example, a piston 128 to move within a cylinder 126 and thereby cause movement of a functional aspect of the equipment on which the open center hydraulic valve 110 is mounted is well-known to skilled practitioners, and can be ascertained by skilled practitioners by reference solely to the schematic diagrams found in FIGS. 1 and 2. For purposes of the following explanation, each of the hydraulic ports 122 and 124 will be assumed to be hydraulically connected to a cylinder 126 on opposite sides of a piston 128, respectively, in a manner similar to that illustrated in FIGS. 1 and 2.

As can be seen in FIGS. 1 and 2, and as will be described further below, when a spool 118 is caused or permitted by spool actuator 120 to be in the neutral position (with the open center core 130 unrestricted by the spool 118, and the fluid passageways between either the power core 138 or the tank galley 132, on the one hand, and the pair of hydraulic ports 122 and 124 associated with the spool 118, on the other hand, being obstructed by the spool 118), no net hydraulic fluid flows to or from the hydraulic ports 122 and 124 to the cylinder 126 on either side of the piston 128, and thus, the piston 128 associated with that spool 118 does not move. Instead, if all of the spools 118 in the valve 114 are in the neutral position, the hydraulic fluid delivered at a constant flow rate (for a given speed of motor 150) by the fixed displacement pump 116 flows unrestricted through the open center core 130 and through the open center of the other spools 118 to the tank galley 132 and to the hydraulic fluid tank 112 where it is re-pumped. (The power used to pump the unused hydraulic fluid flow is, in that case, effectively a loss). Hence, the functions to which the pistons 128 and cylinders 126 are associated (e.g., the height of the fork, as illustrated in block D) do not change, because there is no net change in hydraulic fluid in the cylinders 126 on either side of the pistons 128. The pistons 128 therefore do not move.

Once again referencing FIGS. 1 and 2, when a spool actuator 120 is activated by an operator (using electro-hydraulic valves 180 for spools 118 in blocks B or C for the fork angle adjustment or the fork lock, on the one hand, or using a joystick 182 for spools 118 in blocks D or E for the fork lift or the fork extension, on the other hand) to cause the associated spool 118 to move from the neutral position to a first non-neutral position, the activated spool 118 in the first non-neutral position restricts (partially or fully, depending on the design of the spool 118) the flow of hydraulic fluid pumped by the fixed displacement pump 116 through the open center core 130. The constant flow of hydraulic fluid delivered by the fixed displacement pump 116 is caused by the restriction by the spool 118 of the open center core 130 to increase in pressure. Referring to FIG. 1, the increase in fluid pressure upstream of the activated spool 118 in the open center core 130 is communicated hydraulically to the power core 138 through the open center/power core passage 140. The activated spool 118 also directs pressurized hydraulic fluid to flow from the power core 138 to a pre-selected one of the two hydraulic ports 122 or 124 associated with the activated spool 118 into the cylinder 126 on a first side of the piston 128. The activated spool 118 simultaneously allows fluid to flow out of the cylinder 126 through the other of the two second hydraulic ports 122 or 124 associated with the activated spool 118 which is connected on a second side of the piston 128. That hydraulic fluid then flows through the tank galley 132 to the hydraulic fluid tank 112 (where it is available to be re-pumped).

Thus, the net effect is that hydraulic fluid under pressure flows into the cylinder 126 associated with the activated spool 118 on the first side of the piston 128, and hydraulic fluid flows out of the cylinder 126 on the second side of the piston 128. This causes the piston 128 and any associated load to move toward the second side of the piston 128 associated with the activated spool 118 and the function to change (for example, in the case where the activated spool 118 is in block D associated with the fork lifting function, it would cause the fork to, e.g., rise). Any hydraulic fluid unused by the activated spool 118 flows through the restriction in that spool 118 via the open center core 130 to be either utilized by remaining downstream spools 118, or to then flow through the tank galley 132 to the hydraulic fluid tank 112.

On the other hand, if, as illustrated in FIGS. 1 and 2, the equipment operator manipulates the actuator 120 to cause the spool 118 to move from the neutral position to a second non-neutral position, that once again causes a restriction of the open center core 130, and causes the fluid flowing through the open center core 130 to increase in pressure. That increase in hydraulic pressure is once again communicated from the open center core 130 to the power core 138 through open center/power core passage 140. At the same time, hydraulic fluid is permitted by the activated spool 118 to flow out of the cylinder 126 on a first side of the piston 128 through a selected one of the two connected hydraulic ports 122 or 124 associated with activated spool 118 and through the tank galley 132 to the hydraulic fluid tank 112. Also at the same time, the activated spool 118 directs pressurized hydraulic fluid (under pressure due to restriction of the opening in the open center core 130 by the activated spool 118) to flow from the power core 138 through the other of the associated hydraulic ports 122 or 124 into the cylinder 126 on a second side of the piston 128.

Thus, hydraulic fluid under pressure is introduced to the cylinder 126 on a second side of the piston 128, and hydraulic fluid is drained from the cylinder 126 on a first side of the piston 128. This causes the piston 128 to move toward the first side of the piston 128 and the equipment function to change (for example, in the case where the activated spool 118 is in block D associated with the fork lifting function, it would cause the fork to, e.g., lower). Once again, any hydraulic fluid unused by the activated spool 118 would flow through the restriction in the spool 118 via the open center core 130 to be either utilized by remaining downstream spools 118, or to then flow through the tank galley 132 to the hydraulic fluid tank 112.

A skilled artisan would recognize, of course, that this activation of spools 118 in the valve 114 can be utilized to operate a number of different equipment functions having moving components, and would not be limited to fork lifting (or to telehandlers).

Further details of the operation of the prior art open center hydraulic valve system 110 illustrated in FIG. 1 are described below. The explanation herein concerning the operation of a single spool 118 (and its associated pair of hydraulic ports 122 and 124) within a single valve 114 associated with a particular single function is illustrative, and is not limited to that particular single spool 118 or valve 114, and applies to other spools 118 within the open center hydraulic valve system 110 as well.

Because the pump for the prior art open center hydraulic valve system 110 is a fixed displacement pump 116, the flow of the hydraulic fluid supplied by the fixed displacement pump 116 is constant for a given speed for the motor 150 on the equipment in which the prior art open center hydraulic valve system 110 is mounted.

When the activators such as the electro-hydraulic valves 180 and the joystick 182 associated with the spool actuators 120 for the valve 114 in the prior art open center hydraulic valve system 110 are in the neutral position, all of the associated spools 118 are likewise in the neutral position. As illustrated in FIG. 1, the centers of the valve spools 118 are open, the net flow paths to the associated hydraulic ports 122 and 124 (from the open center core 130 or the power core 138), or from the hydraulic ports 122 and 124 (to the tank galley 132), are blocked by the spools 118, and all net hydraulic fluid flow pumped by the fixed displacement pump 116 from the hydraulic fluid tank 112 at a constant flow rate through the open center core 130 flows unrestricted through the open center core 130 through the spools 118 to the tank galley 132 and then back to the hydraulic fluid tank 112, where it is again available to be re-pumped.

When one of the functions associated with the prior art open center hydraulic valve system 110 is desired to be activated, the spool actuator 120 associated with that function is activated by an equipment operator using an activator such as an electro-hydraulic valve 180 or a joystick 182 in order to move the associated spool 118 (upwards or downwards, or from side to side, as shown in the schematics in FIGS. 1 and 2) in order to restrict the opening through the open center core 130 to the tank galley 132. This restriction of hydraulic fluid flow by the activated spool 118 in the open center core 130 increases the pressure of the hydraulic fluid in the open center core 130 being provided at a constant flow rate by the fixed displacement pump 116 upstream of the activated spool 118. The resulting increased hydraulic fluid pressure in the open center core 130 upstream of the activated spool 118 is transmitted hydraulically through the open center/power core passage 140 to the power core 138.

Assuming that the hydraulic port 122 associated with activated spool 118 is connected to the associated cylinder 126 on a first side of piston 128, and associated hydraulic port 124 is connected to that cylinder 126 on the second side of piston 128, and referring to FIGS. 1 and 2, if the chosen spool actuator 120 is activated with the intention of causing the associated piston 128 to move to a first non-neutral position (and to thereby, in the example described above of the spool 118 associated with block D, lift a fork and any associated load), then not only is the open center core 130 restricted to cause an increase in pressure to occur in the open center core 130 upstream of the activated spool 118 and be transmitted via the open center/power core passage 140 to the power core 138, but the spool 118 at the same time opens a hydraulic passage in the valve 114 between associated hydraulic port 122 (hydraulically connected to a cylinder 126 at a first side of the piston 128, in the manner illustrated in FIGS. 1 and 2) and the power core 138. The hydraulic fluid, having increased hydraulic pressure in the power core 138, is transmitted through associated hydraulic port 122 to the cylinder 126 on the first side of the piston 128. Simultaneously, activated spool 118 opens a hydraulic passage in the valve 114 between associated hydraulic port 124 (hydraulically connected to a cylinder 126 at a second side of the piston 128, in the manner illustrated in FIGS. 1 and 2) and the tank galley 132. The result is that hydraulic fluid under pressure from the power core 138 flows through associated hydraulic port 122 and begins filling the cylinder 126 on the first side, e.g., below the piston 128, and hydraulic fluid is permitted to leave the cylinder 126 on the second side, e.g., above the piston 128 by flowing through associated hydraulic port 124 into the tank galley 132 to return to the hydraulic fluid tank 112, where it is available to be re-pumped. By adding sufficiently pressurized hydraulic fluid to the cylinder 126 below the piston 128, and by reducing hydraulic fluid in the cylinder 126 above the piston 128, the piston 128 (and, in the example described above, the attached fork and its associated load) is lifted.

Conversely, if the chosen spool actuator 120 is activated with the intention of causing the piston 128 to move to a second non-neutral position (and to thereby, in the example of the spool 118 associated with block D, cause a fork to lower), then not only does the activated spool 118 cause the open center core 130 to be restricted to cause an increase in fluid pressure in the open center core 130 upstream of activated spool 118 to be hydraulically transmitted to the power core 138 via open center/power core passage 140, but also the activated spool 118 opens a hydraulic passage in the valve 114 between the associated hydraulic port 124 (hydraulically connected to cylinder 126 at a second side of the piston 128) and the power core 138 (having pressurized hydraulic fluid). Simultaneously, the activated spool 118 opens a passage in valve 114 between associated hydraulic port 122 (hydraulically connected to cylinder 126 on a first side of the piston 128), and the tank galley 132, allowing hydraulic fluid to flow out of the cylinder 126 from the first side of the piston 128 to the tank galley 132 and the hydraulic fluid tank 112. The result is that hydraulic fluid under pressure from the power core 138 begins filling the cylinder 126 on the second side, e.g., above, and hydraulic fluid begins leaving the cylinder 126 on the first side, e.g., below, thereby causing the associated piston 128 (and, in the above example, the attached fork and its associated load) to lower.

When the open center hydraulic valve system 110 is used to operate a function on the equipment on which it is mounted, hydraulic pressure must be built up in the open center core 130 (which, as previously discussed, is then communicated via the open center/power core passage 140 to the power core 138, and then to one of the two hydraulic ports 122 or 124 associated with that function) sufficient to match the load for the function. In the example described above of an open center hydraulic valve system 110 used on a telehandler, with the raising or lowering of the fork lift function being associated with the spool 118 of block D of valve 114, for instance, the hydraulic pressure developed in the open center core 130, which is then delivered to the selected one of the two hydraulic ports 122 or 124 associated with block D must be sufficient to move associated piston 128, the fork attached to the piston 128, and the load on the fork, all under precise operator control. This is accomplished by the operator manipulating the activators (in the example discussed above for block D of valve 114 for raising or lowering the fork, the relevant activator would be movement of the two-axis joystick 182 in the horizontal direction as illustrated in FIG. 1) to activate the associated spool actuator 120 for the spool 118 in block D so as to cause the spool 118 in block D to restrict the flow of hydraulic fluid provided by the fixed displacement pump 116 (at a constant rate for a given motor speed) through the open center core 130. This restriction by the associated spool 118 of the hydraulic fluid flow through the open center core 130 causes the hydraulic pressure to increase upstream of the activated spool 118. That increase in hydraulic pressure is transmitted to the open center/power core passage 140, then to the power core 138, and then through the activated spool 118 to the selected one of the two hydraulic ports 122 or 124 associated with the activated spool 118, as determined by the operator.

In the example previously discussed, where the operator was operating a joystick 182 to activate the raising of the fork function associated with block D of valve 114, the operator would cause the activated spool 118 to move to a first non-neutral position which would restrict the flow of hydraulic fluid to the point that sufficient hydraulic fluid pressure has been built up in the power core 138 and delivered to hydraulic port 122 (while at the same time allowing hydraulic fluid to drain from hydraulic port 124 to the tank galley 132 and then to the hydraulic fluid tank 112)—that is, sufficient hydraulic pressure would be generated to raise associated piston 128, the attached fork, and any associated load on that fork. Unless and until the operator had caused sufficient hydraulic pressure to be generated by the flow restriction caused by the activated spool 118, the fork and any associated load would not, of course, be raised. Stated another way, when any of the functions associated with valve 114 are operated, hydraulic pressure must be built up in the power core 138 to match the load associated with the chosen functions.

During the operation of the chosen functions, the operator often requires quick movements and fine control. In addition, the operator often executes more than one function associated with the valve 114 simultaneously. Furthermore, different functions and different movements associated with a function require different hydraulic pressures. In the example discussed above for the valve 114 associated with a telehandler, for instance, the fork lifting and fork extension functions (blocks D and E) require considerably more hydraulic pressure than the fork angle and fork lock functions (blocks B and C). Additionally, different movements of functions require more hydraulic pressure than others. For instance, raising the fork with a load requires more hydraulic pressure than lowering the fork with a load. Moreover, even similar movements of the same function may require different hydraulic pressures depending upon different conditions. For example, raising the fork may require more or less hydraulic pressure depending upon the fork position or weight of the load being raised.

As discussed above, operation of the fork angle and fork lock (blocks B and C, FIGS. 1 and 2) require considerably less amounts of hydraulic pressure than the fork lifting and fork extension functions (blocks D and E, FIGS. 1 and 2), and therefore are not discussed further. Similarly, operation of the brake system 188 and the steering system 184 (FIG. 1) require relatively small amounts of hydraulic pressure, and can be effectively disregarded for purposes of further discussion of the valve 114. They have been removed from FIG. 2 for purposes of clarity.

In practice, during the operation of equipment commonly utilizing valve 114, such as the telehandler example discussed above, the operator of the equipment will activate several functions simultaneously. In the example of the telehandler, the fork lifting and fork extension functions (blocks D and E of FIGS. 1 and 2) are often operated simultaneously, frequently using a two-axis joystick 182 (see FIG. 1). For instance, the operator may simultaneously lift and extend the fork arm so that the load on the fork follows a substantially vertical trajectory. In the open center hydraulic valve system 110 illustrated in FIGS. 1 and 2, if the operator simultaneously activates several functions, especially including the fork lifting and fork extension (blocks D and E), the equipment will not respond as the operator commanded. Generally, the fork extension function (block E) requires a lower hydraulic pressure in the hydraulic fluid than does the fork lifting function (block D). On the other hand, in hydraulic systems, absent some compensation in the system design, the flow of hydraulic fluid follows the path of least resistance (i.e., the path in which the pressure is lowest). Consequently, in order for an operator to control both functions (fork lifting and fork extension), the operator is required to utilize the activator (e.g., joystick 182) in a manner to meticulously meter the flow of hydraulic fluid through the extension function (block E of valve 114) creating a power loss. Furthermore, the controllability that can be attained using that technique is not very high and depends considerably on the ability and skills of the operator, because the two hydraulic pressures to be delivered to the functions are dependent on the load and fork position (extension, height, and angle), which change.

In order to overcome the issues discussed above with respect to the open center hydraulic valve system 110, and to establish better equipment controllability, load sensing anti-saturation systems have been used. Such a system, however, is much more complicated and much more costly, because it requires the introduction of a variable displacement pump and flow/pressure compensators. Consequently, this potential alternative has been largely deemed unacceptable as being more difficult to maintain and somewhat cost prohibitive.

The present invention, known as a smart flow sharing system, overcomes the problems associated with both the prior art open center hydraulic valve system 110 and the potential alternatives that have been considered and largely rejected in many applications (for example, the load sensing anti-saturation system). The smart flow sharing system provides a relatively uncomplicated and cost-effective alternative hydraulic system that achieves superior controllability for the operator of the equipment on which it is installed.

BRIEF SUMMARY OF THE INVENTION

In view of the foregoing, it is an object of the embodiments of the invention herein to provide a hydraulic valve system, called a smart flow sharing system, that overcomes the shortcomings of prior art open center hydraulic valve systems.

It is another object of the embodiments of the smart flow sharing system invention described herein to provide a hydraulic system capable of hydraulically operating the functions of heavy off-road equipment, such as earth moving, construction, and forestry equipment, including telehandlers, in a manner wherein hydraulic fluid flow is prioritized for the more hydraulically demanding functions of the equipment.

It is yet another object of the embodiments of the smart flow sharing system invention described herein to achieve precise control and fast equipment speed in activated hydraulic functions, regardless of whether the activated functions are among the more hydraulically demanding functions or among the less hydraulically demanding functions, and regardless of whether more than one of the more hydraulically demanding functions are activated at the same time.

Still another object of the embodiments of the smart flow sharing system invention described herein is to achieve the above objects without the addition of complex and difficult to maintain components, without the addition of expensive additional components or systems, and in a manner that is not cost-prohibitive, but rather in a manner that is cost-efficient.

The disclosed embodiments of the present smart flow sharing system invention achieve the aforementioned objects and others because they include features and combinations not found in prior art open center hydraulic valve systems or their known alternatives.

In the described embodiments of the present invention, an improved hydraulic valve system, called a smart flow sharing system, is provided, wherein hydraulic fluid flow under pressure is provided on an automatically prioritized basis to the more demanding hydraulic functions. This prioritization is accomplished without the addition of complex components or expensive extra equipment. Instead, the smart flow sharing system provides a uniquely designed hydraulic system using more than one (preferably two) fixed displacement pumps rather than one, combined with an additional spool, which directs hydraulic fluid flow/pressure in a manner such that if more than one of the more demanding hydraulic functions are simultaneously activated, then one of those more demanding hydraulic functions receives, separately, the hydraulic fluid flow output from the first fixed displacement pump, and the other demanding hydraulic function receives the separate hydraulic fluid flow output from the second fixed displacement pump. On the other hand, if only one of the two more demanding hydraulic functions is activated, then that hydraulic function receives the hydraulic fluid flow output from both the first and second fixed displacement pumps.

As a result, the shortcomings of the prior art are overcome. The provision of hydraulic fluid flow from two fixed displacement pumps to a single demanding hydraulic function results in more precise controllability and quicker equipment speed, permitting even less experienced equipment operators to achieve superior performance. On the other hand, when the two most demanding hydraulic functions are activated at the same time, the automatic prioritization of hydraulic fluid flow so that each of the two demanding hydraulic functions automatically receives hydraulic fluid output from its own separate dedicated fixed displacement pump eliminates complicated and meticulous metering of hydraulic fluid flow, once again enabling even inexperienced operators to achieve fast equipment movement and precise control of the equipment. Furthermore, the smart flow sharing system accomplishes this result without resorting to complex, difficult to maintain hydraulic systems or expensive additional components. The result is a cost-effective and maintenance friendly hydraulic system that is superior to prior art options.

These and other features, objects, and advantages will be understood or apparent to skilled practitioners from the following detailed description and the various drawing figures herein.

DETAILED DESCRIPTION OF THE INVENTION

Figure 3:
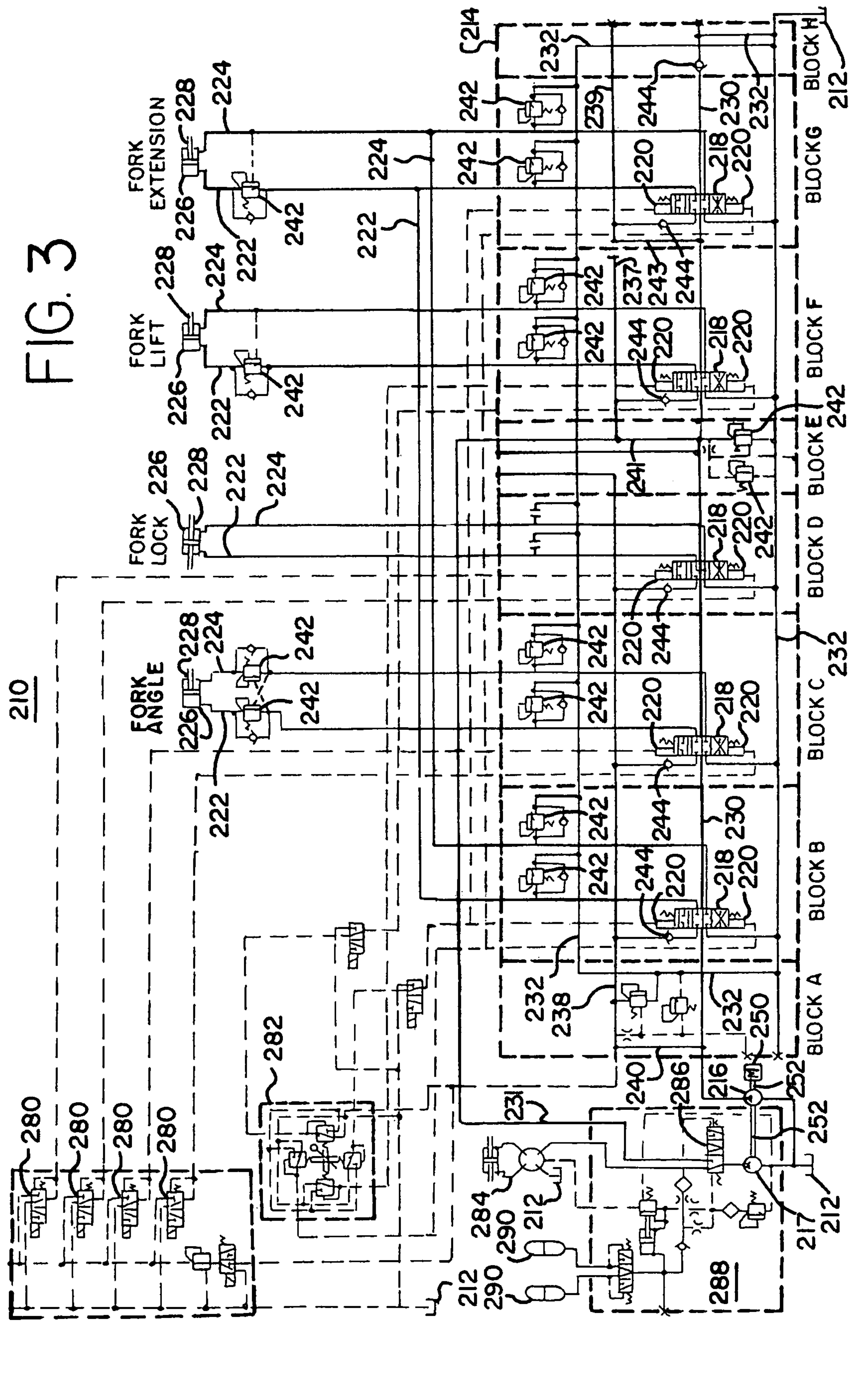
FIG. 3 is a schematic drawing of an embodiment of the smart flow sharing system of the present invention, having one valve, five spools, and four functions corresponding to the spools.
Figure 4:
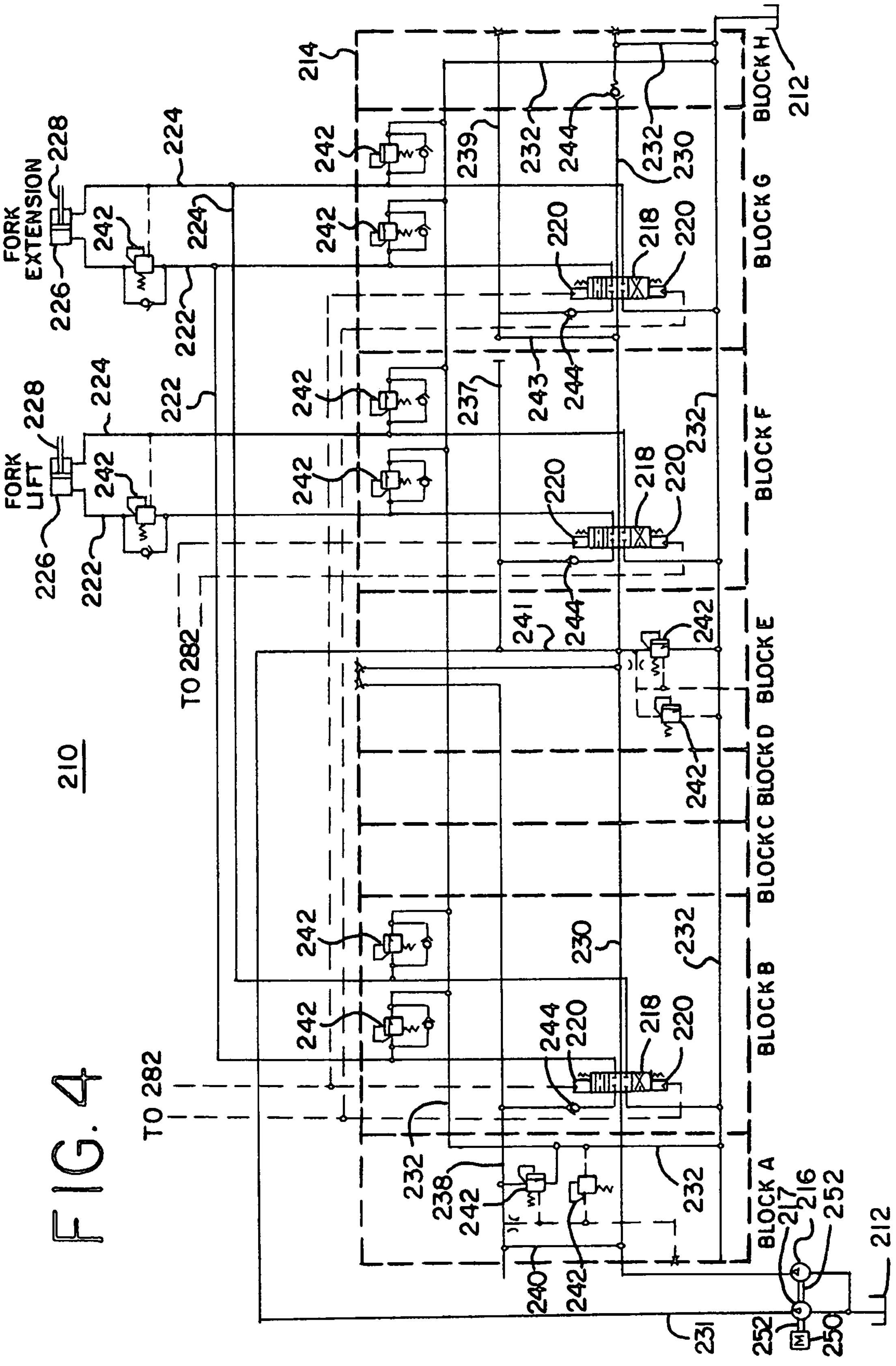
FIG. 4 is a simplified schematic drawing of the embodiment of the invention of FIG. 3, with the steering system, the brake system, the electro-hydraulic activating valves, the joystick, and the contents of valve blocks C and D as well as the components associated therewith removed.

An embodiment of the smart flow sharing system 210 of the present invention is illustrated schematically in FIGS. 3 and 4 in a manner using schematic symbols that would be understood by persons skilled in the art. Once again, for ease of reference, the schematic of the smart flow sharing valve 214 is separated into blocks A-H.

Referring to FIG. 3, the smart flow sharing system 210 includes hydraulic fluid tanks 212, one or more open center hydraulic valve banks designed in the manner described and illustrated herein ("smart flow sharing valves") 214, a first fixed displacement pump 216, a second fixed displacement pump 217, and a single motor 250 preferably running both the first and second fixed displacement pumps 216 and 217, with the motor 250 preferably driving first and second fixed displacement pumps 216 and 217 using a common single motor shaft 252. Each smart flow sharing valve 214 may include one or more spools 218, with each spool 218 activated by a pair of associated spool actuators 220. The spool actuators 220 may be activated by an operator using a variety of activating means, such as electro-hydraulic valves 280 (for the spools 218 in blocks C and D in the embodiment illustrated in FIG. 3) and a two-axis joystick 282 (for the spools 218 in blocks B, F, and G in the FIG. 3 embodiment), although as previously discussed, the spool actuators 220 may be activated by an operator using a variety of known means, including mechanically, electrically, hydraulically, pneumatically, or otherwise.

The smart flow sharing system 210 of the present invention may be housed in a standard manifold (not illustrated) attached to the equipment (e.g., such as a telehandler or other off-road construction, earth moving, or forestry equipment—not illustrated) in which the smart flow sharing system 210 is being used. The first and second fixed displacement pumps 216 and 217 may be driven by a motor 250, powered by a power take-off (not illustrated), which, in turn, is mounted to a transmission (not illustrated) connected to the prime mover of the equipment.

Each spool 218 of the smart flow sharing system 210 in FIG. 3 operates in the same manner as described above for spools 118 in the prior art open center hydraulic valve system 110 to provide selective hydraulic communication with a pair of hydraulic ports 222 and 224 associated with each spool 218. In a typical application of the invention, each pair of hydraulic ports 222 and 224 associated with each spool 218 communicate hydraulically with a cylinder 226 on opposite sides of a piston 228 to cause piston movement, in a manner similar to that described above for hydraulic ports 122 and 124, cylinders 126, and pistons 128 for the open center hydraulic valve system 110.

Figure 1:
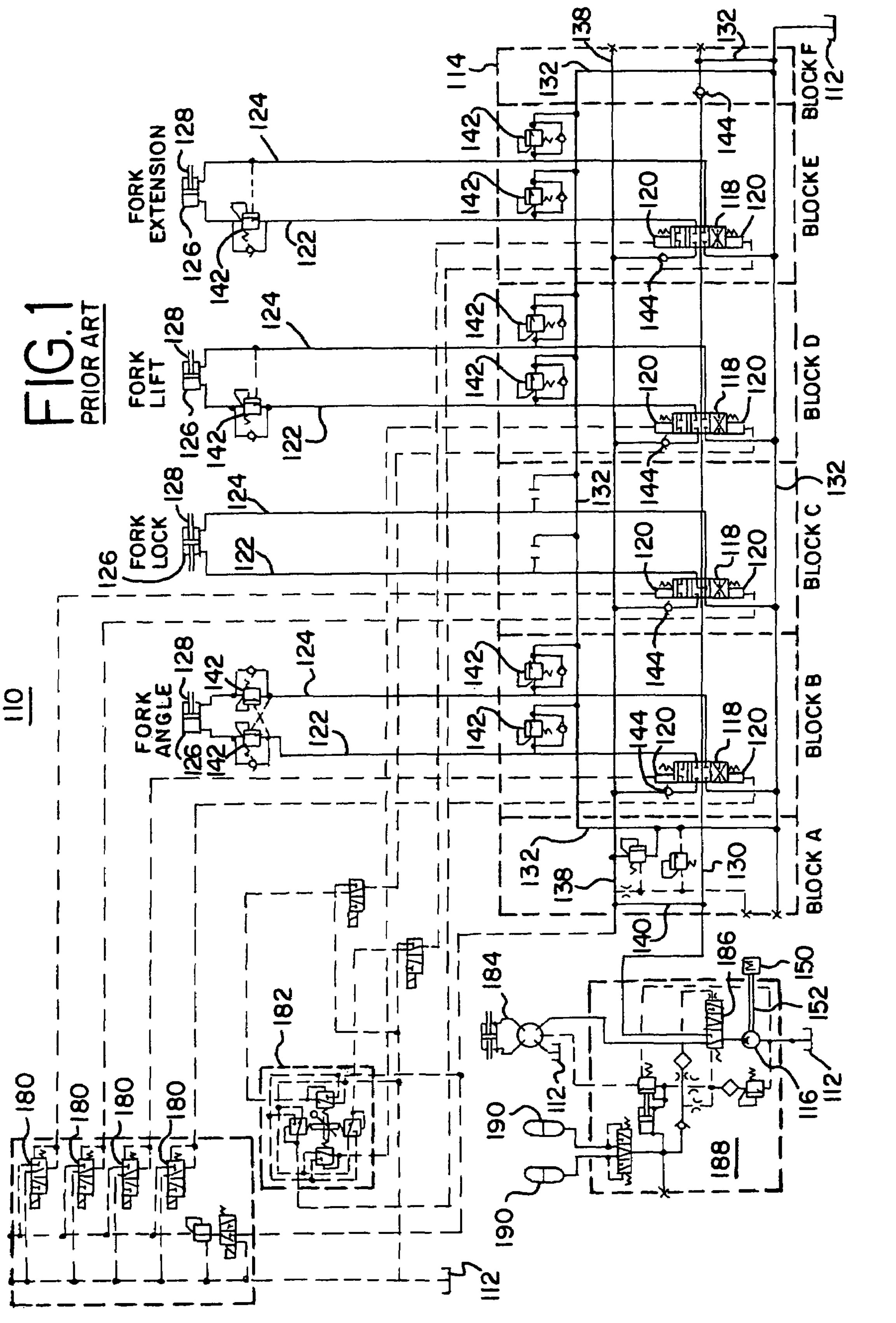
FIG. 1 PRIOR ART
FIG. 1 is a schematic drawing of an embodiment of a prior art open center hydraulic valve system having one valve, four spools, and four functions corresponding to the spools.
Figure 2:
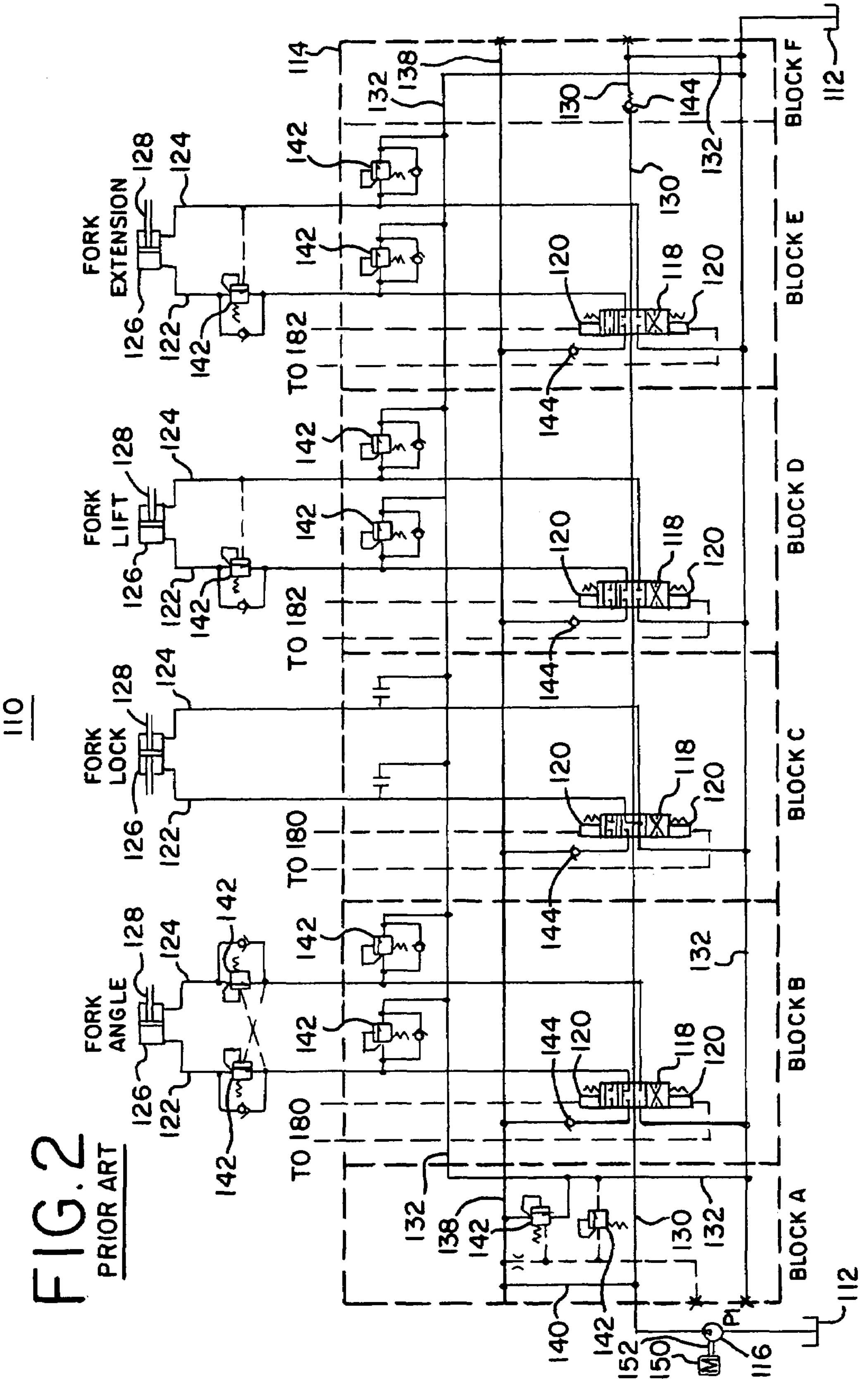
FIG. 2 PRIOR ART
FIG. 2 is a simplified schematic drawing of the prior art open center hydraulic valve system of FIG. 1, with the steering system, the brake system, the electro-hydraulic activating valves, and the joystick removed.

In order to prevent undue repetition, to serve the function of brevity, and to avoid belaboring what is known to skilled practitioners in the art, referring to FIGS. 3 and 4, the operation of the hydraulic ports 222 and 224 hydraulically connected to a cylinder 226 on either end of a load-supporting piston 228 in the smart flow sharing system 210 is the same as explained and illustrated for hydraulic ports 122 and 124 hydraulically connected to the cylinder 126 on either side of piston 128 in the prior art open center hydraulic valve system 110 previously described and illustrated (see, e.g., FIGS. 1 and 2).

Referring once again to FIG. 3, each spool 218 and associated pair of hydraulic ports 222 and 224 of the smart flow sharing valve 214 is associated with a function to be performed by the equipment on which the smart flow sharing system 210 is mounted. Once again, in FIG. 3, the exemplary associated functions that are illustrated are those commonly associated with a telehandler: fork angle adjustment (block C), fork lock (block D), fork lift (block F), and fork extension (blocks B and G), although skilled practitioners would recognize that the above functions and equipment associated with the smart flow sharing system 210 are provided for illustration purposes, and can vary considerably in actual applications.

Referring to FIGS. 3 and 4, an open center core 230 flows through each of the spools 218 of the smart flow sharing valve 214. The smart flow sharing valve 214 also includes a first power core 238 for hydraulic communication of pressurized hydraulic fluid, and a tank galley 232 for return of hydraulic fluid to one or more hydraulic fluid tanks 212, where it becomes available to be re-pumped. (While hydraulic fluid tanks 212 are illustrated in FIGS. 3 and 4 in multiple locations for purposes of simplifying the schematics, skilled practitioners would recognize that the multiple illustrated locations of hydraulic fluid tanks 212 would preferably constitute a single hydraulic fluid tank 212, or a system of hydraulically interconnected hydraulic fluid tanks 212, in actual operation).

Importantly, the first power core 238 of the smart flow sharing system 210 (see FIGS. 3 and 4) differs significantly from the power core 138 of the open center hydraulic valve system 110 (see FIG. 1). First power core 238 does not extend through all of the blocks of the smart flow sharing valve 214, unlike the power core 138 in prior art valve 114. Instead, first power core 238 hydraulically connects with a predetermined selected number of spools 218 before terminating ("deadheading"). First power core 238 preferably connects to those spools 218 that are associated with hydraulic functions that are less demanding, and to only one of the functions that is more demanding. In the embodiment illustrated in FIGS. 3 and 4, first power core 238 is hydraulically connected to the spools 218 associated with the fork angle and fork lock functions (blocks C and D of smart flow sharing valve 214) which, as previously discussed, are less demanding hydraulic applications than the fork lift and fork extension functions (blocks F and G). In addition, one of the spools 218 (preferably the most upstream spool 218) hydraulically connected to first power core 238 (see block B) is also one of two spools 218 hydraulically connected to one of the more hydraulically demanding functions. In the illustrated embodiment, the hydraulic output (hydraulic ports 222 and 224) of both the spool 218 in block B (hydraulically connected to the first power core 238) and the spool 218 in block G are hydraulically connected to cylinder 226 associated with the hydraulically demanding fork extension function (block G) on opposite sides of piston 228. The actuators 220 of the aforesaid pair of spools 218 (in blocks B and G) for the fork extension function are preferably connected to and simultaneously activated by the same activation device, in this embodiment, the same activating output from joystick 282 (vertical movement of the joystick 282, as illustrated in FIG. 3).

As illustrated in FIGS. 3 and 4, smart flow sharing valve 214 has an open center core 230 extending substantially the length of the smart flow sharing valve 214 through all of the spools 218 associated with each of the hydraulic functions. Open center core 230 receives the hydraulic fluid pumped by first fixed displacement pump 216. As will be discussed further below, open center core 230 also receives, further downstream, hydraulic fluid pumped by second fixed displacement pump 217. The hydraulic fluid provided by first displacement pump 216 and second displacement pump 217 flows substantially unimpeded through the open center core 230 to the connected tank galley 232 and then to the hydraulic fluid tank 212 if all of the spools 218 are in the non-activated neutral position. Indeed, tank galley 232 receives all hydraulic fluid conducted through open center core 230 that is unused by the hydraulic functions associated with spools 218.

A first open center/power core passage 240 hydraulically connects the open center core 230 with the first power core 238 upstream of the first upstream spool 218 (e.g., see block B) associated with the first power core 238. If one or more of the spools 218 associated with the first power core 238 (e.g., blocks B, C, and D in FIG. 3) are activated, the activated spool 218 restricts the passage of hydraulic fluid through the open center core 230 upstream of the activated spool 218, causing an increase in hydraulic fluid pressure. The increase in hydraulic fluid pressure is hydraulically communicated through the first open center/power core passage 240 to the first power core 238.

At the same time, and in the same manner discussed previously for activated spools 118, the activated spools 218 open one of the two associated hydraulic ports 222 or 224 to receive the pressurized hydraulic fluid from the first power core 238, and open the other of the two associated hydraulic ports 222 or 224 to hydraulically connect via the tank galley 232 to the hydraulic fluid tank 212. Because the hydraulic ports 222 and 224 are connected to an associated cylinder 226 on either side of the associated piston 228, pressurized hydraulic fluid enters the associated cylinder 226 on one side of the piston 228, and drains out of the cylinder 226 on the other side of the piston 228, causing the piston 228 to move toward the side of the cylinder 226 where hydraulic fluid is draining, and the associated hydraulic function to occur.

Downstream of the spools 218 associated with the first power core 238 are one or more spools 218 associated with a second power core 237. Second power core 237 is separated from first power core 238. A second open center/power core passage 241 is separated from both open center core 230 and second power core passage 237, upstream of any spools 218 associated with the second power core 237, and downstream of any spools 218 associated with first power core 238.

Second fixed displacement pump 217 pumps hydraulic fluid from hydraulic fluid tank 212 through second pump passage 231, which is hydraulically connected to the open center core 230 downstream of the spools 218 associated with the first power core 238, and upstream of any spools 218 associated with the second power core 237. Preferably and advantageously, second pump passage 231 may be hydraulically connected to open center core 230 by hydraulically connecting second pump passage 231 to second open center/power core passage 241.

If one or more spools 218 associated with second power core 237 (preferably, one such spool 218, as illustrated, in block F of FIGS. 3 and 4) is activated by an operator using an activator (in FIG. 3, by moving the joystick 282 in a horizontal direction, as illustrated in FIG. 3) acting upon one of the spool actuators 220 associated with the to-be-activated spool 218, then the spool 218 that is activated thereby restricts flow of hydraulic fluid received from the first fixed displacement pump 216 (if any, because the activation of upstream spools 218 associated with the first power core 238 could restrict hydraulic fluid flow from first fixed displacement pump 216 through open center core 230) and the second fixed displacement pump 217 through the open center core 230. Because the first and second fixed displacement pumps 216 and 217 are providing hydraulic fluid at a constant rate of flow (for a given speed of motor 250), the restriction by the activated spool 218 associated with second power core 237 (see spool 218 in block F) of the open core passage 230 results in an increase in hydraulic fluid pressure in the open center core 230 upstream of the activated spool 218, which is then hydraulically communicated through the second open center/power core passage 241 to the second power core 237.

Once again, the activated spool 218 (in the embodiment illustrated in FIGS. 3 and 4, located in block F) at the same time opens the selected one of the two associated ports 222 or 224 to receive pressurized hydraulic fluid from the second power core 237, while the other of the two associated hydraulic ports 222 or 224 is connected to the tank galley 232 and thereby caused to drain hydraulic fluid to the hydraulic fluid tank 212. This, once again, causes the associated cylinder 226 to be filled with pressurized hydraulic fluid on one side of the piston 228, and causes hydraulic fluid to drain out of the associated cylinder 226 on the other side of the piston 228, which, in turn causes the piston 228 to move toward the draining side of the cylinder 226. Piston movement causes the hydraulic function to operate. In the case of the embodiment of the invention discussed above, and in particular block F of the smart flow sharing valve 214, this would cause the fork lift to operate.

Further downstream of the spools 218 associated with the first and second power cores 238 and 237 are one or more spools 218 (preferably one spool 218) associated with a third power core 239. Third power core 239 is separate from either the first or second power cores 238 or 237. A third open center/power core passage 243 hydraulically connects the third power core 239 and the open center core 230 upstream of any spools 218 associated with third power core 239, and downstream of any spools 218 associated with first power core 238 or second power core 237.

If one or more spools 218 associated with third power core 239 is activated (in the embodiment depicted in FIGS. 3 and 4, and discussed above, there is one such spool 218 in block G) by an operator using an activator (movement of the joystick 282 in the vertical direction as illustrated in the embodiment in FIG. 3) acting upon a spool actuator 220 associated with the spool 218 that is being activated, then the smart flow sharing valve 214 is designed to have several things occur at the same time.

As previously discussed, an operator's activation of the joystick 282 in order to activate the spool 218 in block G simultaneously activates the spool 218 in block B, because the actuators 220 for both spools 218 (blocks B and G) have a common activator (the vertical movement of the two-axis joystick 282 in the illustrated embodiment in FIG. 3). (The spool 218 associated with block F is also activated by the two-axis joystick 282 illustrated in FIG. 3, however, the spools 218 in blocks B and G are simultaneously activated by movement of the joystick 282 in the vertical direction illustrated in FIG. 3, while movement in horizontal direction of the joystick 282 as illustrated in FIG. 3 activates the spool 218 in block F).

Upon activation of spools 218 in blocks B and G, the spool 218 in block G restricts the open core passage 230 passing through that activated spool 218. Because the hydraulic fluid flow is pumped at a constant rate (for a given speed of motor 250) by the first fixed displacement pump 216 and the second displacement pump 217 through open center core 230 upstream of spool 218 in block G, the restriction caused by spool 218 in block G (of any unused hydraulic fluid from the first and second fixed displacement pumps 216 and 217) causes hydraulic pressure upstream of that activated spool 218 (in block G) to rise. The increased hydraulic pressure is hydraulically communicated through third open center/power core 243 to third power core 239. The activated spool 218 (in block G) at the same time opens one of the two associated hydraulic ports 222 or 224 to receive pressurized hydraulic fluid from the third power core 239, while the other of two associated hydraulic ports 222 or 224 is connected by the spool 218 to the tank galley 232.

Because the spool 218 in block B is simultaneously activated when the spool 218 in block G is activated, that spool 218 also restricts the open center core 230 (which at that location is receiving hydraulic fluid flow from the first fixed displacement pump 216 only), and, as discussed previously, activated spool 218 (in block B) provides pressurized hydraulic fluid to the same selected one of hydraulic ports 222 or 224 in block G as does spool 218 in block G.

Consequently, spool 218 in block B causes pressurized hydraulic fluid provided by the first fixed displacement pump 216, and spool 218 in block G causes pressurized hydraulic fluid provided by the second fixed displacement pump 217, both to be transmitted to the selected one of the two hydraulic ports 222 or 224 in block G. Thus, the fork extension function has the benefit of using hydraulic flow from both the first and second fixed displacement pumps 216 and 217 when the fork lift function (block F) is not simultaneously in operation (in which case the spool 218 associated with the fork lift function in block F would be activated, thereby restricting the hydraulic fluid flow of the second fixed displacement pump 217 through open center core 230 to block G).

The smart flow sharing system 210 described above, has distinct advantages versus prior art systems, such as the open center hydraulic valve system 110 described previously. As discussed above, the open center hydraulic valve system 110 suffers from performance issues, in particular, controllability problems, when more than one of the more hydraulically demanding functions (such as the fork lift and fork extension functions in the example of a telehandler) are operated at the same time, as frequently happens. The smart flow sharing system 210 described herein overcomes such problems without adding significantly costly components, and without greatly adding to the complexity and maintainability of the hydraulic system.

The smart flow sharing system 210 invention adds, among other features, a second fixed displacement pump 217, and a spool 218 (in block B), relatively inexpensive components, in order aid in overcoming the problems associated with the standard prior art open center hydraulic valve system 110. In addition, the invention described herein provides an improved system of routing and automatically prioritizing hydraulic fluid flow that facilitates the operation of more than one demanding hydraulic functions simultaneously.

The additional second fixed displacement pump 217, together with the improved system of routing hydraulic fluid flow, combine to prioritize fluid flow simultaneously to the more demanding hydraulic functions so that none of the more demanding hydraulic functions uses an amount of hydraulic fluid flow to the detriment of the remaining demanding hydraulic functions.

In the embodiment described herein, for instance, ignoring for purposes of this discussion the hydraulic fluid flow used by less demanding hydraulic functions (such as the brake system 288, the steering system 284, the fork angle adjustment (block C), and the fork lock (block D) functions, which even when in use utilize relatively little hydraulic fluid flow compared to the fork lift (block F) and fork extension (block G) functions), the smart flow sharing system 210 automatically prioritizes the hydraulic fluid flow output of the first and second fixed displacement pumps 216 and 217 as described below.

(1) Fork Lift Activated, But Fork Extension Not Activated. When the fork lift function (block F in the embodiment in FIG. 3) is activated, but the fork extension function (block G) is not activated, any unused hydraulic fluid output of the first fixed displacement pump 216 (i.e., unused by the hydraulically less demanding upstream functions and unused by the fork extension function) and substantially the entire hydraulic fluid output of the second fixed displacement pump 217 is available to be directed to the second power core 237, and is thereby directed by the activated spool 218 in block F to the selected one of the two associated hydraulic fluid ports 222 or 224, and thereby to the cylinder 226 and piston 228 associated with the fork lift function.

Depending on how many, if any, of the less demanding upstream hydraulic functions (blocks C and D) are activated, first fixed displacement pump 216 provides most or substantially all of its hydraulic fluid flow through open center core 230 to spool 218 in block F. The second fixed displacement pump 217 provides substantially all of its hydraulic fluid flow through second pump passage 231 (through second open center/power core passage 241 and then through open center core 230) to spool 218 in block F. Because spool 218 in block F is activated, it restricts the open center core 230. This causes the hydraulic fluid flow supplied by both the first and second fixed displacement pumps 216 and 217 to increase in pressure upstream of the activated spool 218 in block F. That increase in hydraulic fluid pressure caused by the restriction of the flow of both the first and second fixed displacement pumps 216 and 217 is communicated through the second open center/power core passage 241 to the second power core 237, where it is thereafter transmitted through the activated spool 218 in block F to the selected one of the two associated hydraulic ports 222 or 224, and then the cylinder 226 and piston 228 in block F to perform the selected hydraulic function, in this case, lifting or lowering of the fork. Thus, the hydraulic fluid output of both the first and second fixed displacement pumps 216 and 217 is available for the fork lift function.

(2) Fork Extension Activated, But Fork Lift Not Activated. When the fork extension function (blocks B and G in the embodiment in FIG. 3) is activated, but the fork lift function (block F) is not activated, hydraulic fluid output of the first fixed displacement pump 216 and substantially the entire hydraulic fluid output of the second fixed displacement pump 217 is directed by the simultaneous activation of the two spools 218, namely, spool 218 associated with block B and spool 218 associated with G, to the selected one of the two associated hydraulic fluid ports 222 or 224 in block G, and thereby to the cylinder 226 and piston 228 in block G associated with the fork extension function, in the manner previously described herein.

That is, activation of spool 218 in block B restricts hydraulic fluid flow from first fixed displacement pump 216 through the open center core 230, causing an increase in hydraulic fluid pressure upstream of that activated spool 218. That increased hydraulic fluid pressure is communicated through first open center/power core passage 240 to first power core 238, where it is directed by the activated spool 218 to the selected one of the two hydraulic fluid ports 222 or 224 and then to the cylinder 226 and piston 228 associated with the fork extension function (block G).

At the same time, substantially the entire hydraulic fluid flow from second fixed displacement pump 217 flows through second pump passage 231 through second open center/power core passage 241 into open center core 230. Because spool 218 associated with the fork lift function (block F) is not activated, the hydraulic fluid flow output of second fixed displacement pump 217 flows through open center core 230 to the activated spool 218 associated with the fork extension function (block G). That activated spool 218 restricts the hydraulic fluid flow through open center core 230, causing an increase in hydraulic pressure upstream of the activated spool 218 in block G. That increased hydraulic fluid pressure is then communicated to third power core 239, where it is directed by the activated spool 218 to the selected one of the two hydraulic fluid ports 222 or 224 (the same hydraulic port to which pressurized hydraulic fluid was directed by spool 218 in block B) and then to the cylinder 226 and piston 228 associated with the fork extension function (block G). Consequently, the hydraulic fluid output of both the first and second fixed displacement pumps 216 and 217 is available for the fork extension function.

(3) Fork Lift Activated And Fork Extension Also Activated. When both of the most demanding hydraulic functions in the described embodiment, namely, both the fork lift function (block F in the embodiment in FIG. 3) and the fork extension function (block G) are activated, the smart flow sharing system 210 of the present invention provides substantially the entire hydraulic fluid output of the first fixed displacement pump 216 to the selected one of the two associated hydraulic fluid ports 222 or 224 in block G, and thereby to the cylinder 226 and piston 228 in block G associated with the fork extension function, while at the same time substantially the entire hydraulic fluid output of the second fixed displacement pump 217 is directed to the second power core 237, and is thereby directed by the activated spool 218 in block F to the selected one of the two associated hydraulic fluid ports 222 or 224 in block F to the associated cylinder 226 and piston 228 for the fork lift function. The hydraulic fluid flow output of the first and second fixed displacement pumps 216 and 217 is effectively shared by the two most demanding hydraulic functions when they are operated simultaneously. This is in stark contrast to the tendency, as occurs for instance with the prior art open center hydraulic valve system 110, of the hydraulic fluid to flow through the path of least resistance (thereby requiring extensive oversight and metering skill by the operator in order to attempt to simultaneously operate the two most demanding functions, and sacrificing quick movements and fine control of equipment functions).

When both of the more demanding hydraulic functions are activated at the same time, the following occurs.

With respect to the fork extension function (block G), activation of spool 218 in block B restricts hydraulic fluid flow from first fixed displacement pump 216 through the open center core 230, causing an increase in hydraulic fluid pressure upstream of that activated spool 218 in block B. The increased hydraulic fluid pressure is communicated through first open center/power core passage 240 to first power core 238, where it is directed by the activated spool 218 to the selected one of the two hydraulic fluid ports 222 or 224 and then to the cylinder 226 and piston 228 associated with the fork extension function (block G). The simultaneous activation of the spool 218 in block G does not provide hydraulic fluid flow/pressure to third power core 239 and to the fork extension function because, as will be described below, substantially all of the hydraulic fluid flow from second fixed displacement pump 217 through open center core 230 is restricted, and thereby diverted by activated spool 218 in block F (due to simultaneous activation of the fork lift function) before the hydraulic fluid flow reaches the spool 218 in block G. Thus, the fork extension function operates based upon hydraulic fluid flow provided by first displacement pump 216, but not second displacement pump 217.

As concerns the fork lift function, substantially the entire hydraulic fluid output of the second fixed displacement pump 217 is directed to the second power core 237 and is thereby directed by the selected one of the two associated hydraulic fluid ports 222 or 224 to the cylinder 226 and piston 228 associated with the fork lift function. The hydraulic fluid flow output of the first fixed displacement pump 216, however, is substantially diverted by activated spool 218 in block B from the open center core 230 before reaching activated spool 218 in block F, for the reasons discussed in the preceding paragraph. Thus, substantially all of the hydraulic fluid flow output of first fixed displacement pump 216 is unavailable for the fork lifting function (block F), because it is being made available to the fork extension function (block G).

The second fixed displacement pump 217 provides all of its hydraulic fluid flow through second pump passage 231 (through second open center/power core passage 241) to spool 218 in block F. Activation of spool 218 in block F restricts the open center core 230. This causes the hydraulic fluid flow supplied by the second fixed displacement pump 217 to increase in pressure upstream of the activated spool 218 in block F. That increase in hydraulic fluid pressure caused by the restriction of the flow of the second fixed displacement pump 217 is communicated through the second open center/power core passage 241 to the second power core 237, where it is thereafter transmitted through the activated spool 218 in block F to the selected one of the two associated hydraulic ports 222 or 224, and then to the cylinder 226 and piston 228 in block F to lift or lower the fork. Consequently, the fork lift function operates based upon hydraulic fluid flow provided by the second fixed displacement pump 217, but not the first fixed displacement pump 216.

The smart flow sharing system 210 invention described above enables an equipment operator to exercise fine control of the equipment's main functions, including the most hydraulically demanding functions operated simultaneously, without introducing expensive components into the hydraulic system. By automatically prioritizing the supply of pressurized hydraulic fluid to the most demanding hydraulic functions (the fork lift and fork extension functions in blocks F and G of the embodiment described and illustrated herein), the smart flow sharing system 210 invention provides an equipment operator with precise control and faster equipment speed than prior art systems, without adding cost-prohibitive extra components.

In situations where only one of the two most demanding hydraulic functions are activated by the operator, both first and second fixed displacement pumps 216 and 217 supply the activated function, resulting in the operator achieving faster speed of the equipment function. When, on the other hand, the two most hydraulically demanding functions are activated at the same time, the smart flow sharing system 210 separately causes the first fixed displacement pump 216 to supply hydraulic fluid flow/pressure to one of the demanding hydraulic functions (in the described embodiment, to the fork extension, block G), and the second fixed displacement pump 217 to supply hydraulic fluid flow/pressure to the other demanding hydraulic function (in the embodiment, to the fork lift, block F). The separate supply to each demanding function allows precise controllability, and eliminates the need for meticulous metering of the hydraulic flow to operate both functions. Consequently, the invention enables precise control by less experienced or skilled operators.

By adding a small number of relatively inexpensive components and changing the hydraulic passages to prioritize the flow of hydraulic fluid, the invention of the smart flow sharing system 210 significantly improves hydraulic performance while maintaining cost effectiveness.

While the above-described embodiment of the smart flow sharing system 210 invention has been found and is believed to be useful and preferable, particularly in certain application using the invention in connection with telehandlers or other off-road earth moving, construction, and forestry equipment, skilled practitioners will recognize that other combinations of elements, dimensions, or materials can be utilized, and other equipment applications can be realized, without departing from the invention claimed herein. Moreover, although certain embodiments of the invention have been described by way of example, it will be understood by skilled practitioners that modifications may be made to the disclosed embodiments without departing from the scope of the invention, which is defined by the claims.

Having thus described exemplary embodiments of the invention, that which is desired to be secured by Letters Patent is claimed below.

I claim:

1. A smart flow sharing system for operation of hydraulic equipment, comprising:

(1) a first fixed displacement pump;

(2) a second fixed displacement pump;

(3) an open center core for conducting hydraulic fluid, wherein the open center core has a first end and a second end;

(4) a first power core for conducting hydraulic fluid;

(5) a first open center/power core passage for conducting hydraulic fluid, having a first end and a second end, wherein the first end of the first open center/power core passage is hydraulically connected to the open center core, and the second end of the first open center/power core passage is hydraulically connected to the first power core;

(6) a second power core for conducting hydraulic fluid;

(7) a second open center/power core passage for conducting hydraulic fluid, having a first end and a second end, wherein the first end of the second open center/power core passage is hydraulically connected to the open center core, and the second end of the second open center/power core passage is hydraulically connected to the second power core;

(8) a third power core for conducting hydraulic fluid;

(9) a third open center/power core passage for conducting hydraulic fluid, having a first end and a second end, wherein the first end of the third open center/power core passage is hydraulically connected to the open center core, and the second end of the third open center/power core passage is hydraulically connected to the third power core;

(10) a hydraulic fluid tank;

(11) a tank galley for conducting hydraulic fluid to the hydraulic fluid tank;

(12) wherein the first end of the open center core is hydraulically connected to and receives hydraulic fluid pumped by the first fixed displacement pump, and the second end of the open center core is hydraulically connected to the tank galley;

(13) a first set of spools comprising at least a first spool;

(14) a second set of spools comprising at least a second spool;

(15) a third set of spools comprising at least a third spool;

(16) wherein each spool in the first set of spools is located between the first open center/power core passage and the second open center/power core passage;

(17) wherein each spool in the second set of spools is located between the second open center/power core passage and the third open center/power core passage;

(18) wherein each spool in the third set of spools is located between the third power core passage and the second end of the open center core;

(19) wherein the second end of the first open center/power core passage is hydraulically connected to the open center core downstream on the open center core from the first fixed displacement pump, and upstream on the open center core of any of the spools in the first set of spools;

(20) wherein the second end of the second open center/power core passage is hydraulically connected to the open center core downstream on the open center core from any of the spools in the first set of spools, and upstream on the open center core of any of the spools in the second set of spools;

(21) wherein the second end of the third open center/power core passage is hydraulically connected to the open center core downstream on the open center core from any of the spools in the second set of spools, and upstream on the open center core of any of the spools in the third set of spools;

(22) a second pump passage for conducting hydraulic fluid, with the second pump passage having a first end and a second end, wherein the first end of the second pump passage is hydraulically connected to and receives hydraulic fluid pumped by the second displacement pump, and the second end of the second pump passage is hydraulically connected to either:

(A) the open center core downstream on the open center core from the first set of spools and upstream on the open center core from the second set of spools; or (B) the second open center/power core passage;

(23) wherein each spool of the first set of spools, has associated therewith:

(A) a first hydraulic port and a second hydraulic port;

(B) a first spool passage between the first power core and the first hydraulic port associated with the spool, that is capable of being opened or closed depending upon the position of the spool;

(C) a second spool passage between the first power core and the second hydraulic port associated with the spool, that is capable of being opened or closed depending upon the position of the spool;

(D) a third spool passage between the tank galley and the first hydraulic port associated with the spool, that is capable of being opened or closed depending upon the position of the spool;

(E) a fourth spool passage between the tank galley and the second hydraulic port associated with the spool, that is capable of being opened or closed depending upon the position of the spool;

(F) a fifth spool passage, wherein the open center core passes through the fifth spool passage, and wherein, depending upon the position of the spool, the spool may permit hydraulic fluid to flow through the fifth spool passage and the open center core in an unrestricted manner, or the spool may partially restrict the hydraulic fluid flowing through the fifth spool passage and the open center core;

(24) wherein each spool of the second set of spools has associated therewith:

(A) a first hydraulic port and a second hydraulic port;

(B) a first spool passage between the second power core and the first hydraulic port associated with the spool, that is capable of being opened or closed depending upon the position of the spool;

(C) a second spool passage between the second power core and the second hydraulic port associated with the spool, that is capable of being opened or closed depending upon the position of the spool;

(D) a third spool passage between the tank galley and the first hydraulic port associated with the spool, that is capable of being opened or closed depending upon the position of the spool;

(E) a fourth spool passage between the tank galley and the second hydraulic port associated with the spool, that is capable of being opened or closed depending upon the position of the spool;

(F) a fifth spool passage, wherein the open center core passes through the fifth spool passage, and wherein, depending upon the position of the spool, the spool may permit hydraulic fluid to flow through the fifth spool passage and the open center core in an unrestricted manner, or the spool may partially restrict the hydraulic fluid flowing through the fifth spool passage and the open center core;

(25) wherein each spool of the third set of spools has associated therewith:

(A) a first hydraulic port and a second hydraulic port;

(B) a first spool passage between the third power core and the first hydraulic port associated with the spool, that is capable of being opened or closed depending upon the position of the spool;

(C) a second spool passage between the third power core and the second hydraulic port associated with the spool, that is capable of being opened or closed depending upon the position of the spool;

(D) a third spool passage between the tank galley and the first hydraulic port associated with the spool, that is capable of being opened or closed depending upon the position of the spool;

(E) a fourth spool passage between the tank galley and the second hydraulic port associated with the spool, that is capable of being opened or closed depending upon the position of the spool;

(F) a fifth spool passage, wherein the open center core passes through the fifth spool passage, and wherein, depending upon the position of the spool, the spool may permit hydraulic fluid to flow through the fifth spool passage and the open center core in an unrestricted manner, or the spool may partially restrict the hydraulic fluid flowing through the fifth spool passage and the open center core;

(26) wherein each spool in the first set of spools has at least a neutral position, a first non-neutral position, and a second non-neutral position, wherein each such spool in the first set of spools operates in the following manner:

(A) in the neutral position, the spool permits hydraulic fluid to flow through the fifth spool passage and the open center core passing therethrough in an unrestricted manner, and the spool blocks the flow of hydraulic fluid through the first spool passage, the second spool passage, the third spool passage, and the fourth spool passage;

(B) in the first non-neutral position, the spool partially restricts the flow of hydraulic fluid through the fifth spool passage and the open center core passing therethrough, the partial restriction causes hydraulic fluid in the open center core upstream of the partial restriction to increase in pressure, the hydraulic fluid under pressure is conducted through the first open center/power core passage into the first power core, the spool opens the first spool passage between the first power core and the first hydraulic port associated with the spool allowing hydraulic fluid under pressure to flow from the first power core to the first hydraulic port associated with the spool, the spool opens the fourth spool passage between the tank galley and the second hydraulic port associated with the spool allowing hydraulic fluid to flow from the second hydraulic port associated with the spool to the tank galley, the spool closes the second spool passage between the first power core and the second hydraulic port associated with the spool, and the spool closes the third spool passage between the tank galley and the first hydraulic port associated with the spool; and (C) in the second non-neutral position, the spool partially restricts the flow of hydraulic fluid through the fifth spool passage and the open center core passing therethrough, the partial restriction causes hydraulic fluid in the open center core upstream of the partial restriction to increase in pressure, the hydraulic fluid under pressure is conducted through the first open center/power core passage into the first power core, the spool opens the second spool passage between the first power core and the second hydraulic port associated with the spool allowing hydraulic fluid under pressure to flow from the first power core to the second hydraulic port associated with the spool, the spool opens the third spool passage between the tank galley and the first hydraulic port associated with the spool allowing hydraulic fluid to flow from the first hydraulic port associated with the spool to the tank galley, the spool closes the first spool passage between the first power core and the first hydraulic port associated with the spool, and the spool closes the fourth spool passage between the tank galley and the second hydraulic port associated with the spool;

(27) wherein each spool in the second set of spools has at least a neutral position, a first non-neutral position, and a second non-neutral position, wherein each such spool in the second set of spools operates in the following manner:

(A) in the neutral position, the spool permits hydraulic fluid to flow through the fifth spool passage and the open center core passing therethrough in an unrestricted manner, and the spool blocks the flow of hydraulic fluid through the first spool passage, the second spool passage, the third spool passage, and the fourth spool passage;

(B) in the first non-neutral position, the spool partially restricts the flow of hydraulic fluid through the fifth spool passage and the open center core passing therethrough, the partial restriction causes hydraulic fluid in the open center core upstream of the partial restriction to increase in pressure, the hydraulic fluid under pressure is conducted through the second open center/power core passage into the second power core, the spool opens the first spool passage between the second power core and the first hydraulic port associated with the spool allowing hydraulic fluid under pressure to flow from the second power core to the first hydraulic port associated with the spool, the spool opens the fourth spool passage between the tank galley and the second hydraulic port associated with the spool allowing hydraulic fluid to flow from the second hydraulic port associated with the spool to the tank galley, the spool closes the second spool passage between the second power core and the second hydraulic port associated with the spool, and the spool closes the third spool passage between the tank galley and the first hydraulic port associated with the spool; and (C) in the second non-neutral position, the spool partially restricts the flow of hydraulic fluid through the fifth spool passage and the open center core passing therethrough, the partial restriction causes hydraulic fluid in the open center core upstream of the partial restriction to increase in pressure, the hydraulic fluid under pressure is conducted through the second open center/power core passage into the second power core, the spool opens the second spool passage between the second power core and the second hydraulic port associated with the spool allowing hydraulic fluid under pressure to flow from the second power core to the second hydraulic port associated with the spool, the spool opens the third spool passage between the tank galley and the first hydraulic port associated with the spool allowing hydraulic fluid to flow from the first hydraulic port associated with the spool to the tank galley, the spool closes the first spool passage between the second power core and the first hydraulic port associated with the spool, and the spool closes the fourth spool passage between the tank galley and the second hydraulic port associated with the spool;

(28) wherein each spool in the third set of spools has at least a neutral position, a first non-neutral position, and a second non-neutral position, wherein each such spool in the third set of spools operates in the following manner:

(A) in the neutral position, the spool permits hydraulic fluid to flow through the fifth spool passage and the open center core passing therethrough in an unrestricted manner, and the spool blocks the flow of hydraulic fluid through the first spool passage, the second spool passage, the third spool passage, and the fourth spool passage;

(B) in the first non-neutral position, the spool partially restricts the flow of hydraulic fluid through the fifth spool passage and the open center core passing therethrough, the partial restriction causes hydraulic fluid in the open center core upstream of the partial restriction to increase in pressure, the hydraulic fluid under pressure is conducted through the third open center/power core passage into the third power core, the spool opens the first spool passage between the third power core and the first hydraulic port associated with the spool allowing hydraulic fluid under pressure to flow from the third power core to the first hydraulic port associated with the spool, the spool opens the fourth spool passage between the tank galley and the second hydraulic port associated with the spool allowing hydraulic fluid to flow from the second hydraulic port associated with the spool to the tank galley, the spool closes the second spool passage between the third power core and the second hydraulic port associated with the spool, and the spool closes the third spool passage between the tank galley and the first hydraulic port associated with the spool; and (C) in the second non-neutral position, the spool partially restricts the flow of hydraulic fluid through the fifth spool passage and the open center core passing therethrough, the partial restriction causes hydraulic fluid in the open center core upstream of the partial restriction to increase in pressure, the hydraulic fluid under pressure is conducted through the third open center/power core passage into the third power core, the spool opens the second spool passage between the third power core and the second hydraulic port associated with the spool allowing hydraulic fluid under pressure to flow from the third power core to the second hydraulic port associated with the spool, the spool opens the third spool passage between the tank galley and the first hydraulic port associated with the spool allowing hydraulic fluid to flow from the first hydraulic port associated with the spool to the tank galley, the spool closes the first spool passage between the third power core and the first hydraulic port associated with the spool, and the spool closes the fourth spool passage between the tank galley and the second hydraulic port associated with the spool;

(29) wherein each of the spools have one or more spool actuators that cause or allow the spool to be in a neutral position, a first non-neutral position, or a second non-neutral position;

(30) wherein the first hydraulic port of the first spool is hydraulically connected to the first hydraulic port of the third spool, and the second hydraulic port of the first spool is hydraulically connected to the second hydraulic port of the third spool; and

(31) wherein the spool actuators for the first spool and the third spool are activated by a common controller, such that:

(A) when the first spool is caused or allowed to be in a neutral position, then the third spool is also caused or allowed to be in a neutral position;

(B) when the first spool is caused or allowed to be in a first non-neutral position, then the third spool is also caused or allowed to be in a first non-neutral position; and (C) when the first spool is caused or allowed to be in a second non-neutral position, then the third spool is also caused or allowed to be in a second non-neutral position.

2. A smart flow sharing system for operation of hydraulic equipment, comprising:

(1) a first fixed displacement pump driven by a motor, wherein the first fixed displacement pump pumps hydraulic fluid at a constant rate for a given motor speed;

(2) a second fixed displacement pump driven by a motor, wherein the second fixed displacement pump pumps hydraulic fluid at a constant rate for a given motor speed;

(3) an open center core for conducting hydraulic fluid, wherein the open center core has a first end and a second end;

(4) a first power core for conducting hydraulic fluid;

(5) a first open center/power core passage for conducting hydraulic fluid, having a first end and a second end, wherein the first end of the first open center/power core passage is hydraulically connected to the open center core, and the second end of the first open center/power core passage is hydraulically connected to the first power core;

(6) a second power core for conducting hydraulic fluid;

(7) a second open center/power core passage for conducting hydraulic fluid, having a first end and a second end, wherein the first end of the second open center/power core passage is hydraulically connected to the open center core, and the second end of the second open center/power core passage is hydraulically connected to the second power core;

(8) a third power core for conducting hydraulic fluid;

(9) a third open center/power core passage for conducting hydraulic fluid, having a first end and a second end, wherein the first end of the third open center/power core passage is hydraulically connected to the open center core, and the second end of the third open center/power core passage is hydraulically connected to the third power core;

(10) a hydraulic fluid tank;

(11) a tank galley for conducting hydraulic fluid to the hydraulic fluid tank;

(12) wherein the first end of the open center core is hydraulically connected to and receives hydraulic fluid pumped by the first fixed displacement pump, and the second end of the open center core is hydraulically connected to the tank galley;

(13) a first set of spools comprising one or more spools, including a first spool;

(14) a second set of spools comprising one or more spools, including a second spool;

(15) a third set of spools comprising one or more spools, including a third spool;

(16) wherein each spool in the first set of spools is located on the open center core between the first open center/power core passage and the second open center/power core passage;

(17) wherein each spool in the second set of spools is located on the open center core between the second open center/power core passage and the third open center/power core passage;

(18) wherein each spool in the third set of spools is located on the open center core between the third power core passage and the second end of the open center core;

(19) wherein the second end of the first open center/power core passage is hydraulically connected to the open center core downstream on the open center core from the first fixed displacement pump, and upstream on the open center core of any of the spools in the first set of spools;

(20) wherein the second end of the second open center/power core passage is hydraulically connected to the open center core downstream on the open center core from any of the spools in the first set of spools, and upstream on the open center core of any of the spools in the second set of spools;

(21) wherein the second end of the third open center/power core passage is hydraulically connected to the open center core downstream on the open center core from any of the spools in the second set of spools, and upstream on the open center core of any of the spools in the third set of spools;

(22) a second pump passage for conducting hydraulic fluid, with the second pump passage having a first end and a second end, wherein the first end of the second pump passage is hydraulically connected to and receives hydraulic fluid pumped by the second displacement pump, and the second end of the second pump passage is hydraulically connected to either:

(A) the open center core downstream on the open center core from the first set of spools and upstream on the open center core from the second set of spools; or (B) the second open center/power core passage;

(23) wherein each spool of the first set of spools, has associated therewith:

(A) a first hydraulic port and a second hydraulic port;

(B) a first spool passage between the first power core and the first hydraulic port associated with the spool, that is capable of being opened or closed depending upon the position of the spool;

(C) a second spool passage between the first power core and the second hydraulic port associated with the spool, that is capable of being opened or closed depending upon the position of the spool;

(D) a third spool passage between the tank galley and the first hydraulic port associated with the spool, that is capable of being opened or closed depending upon the position of the spool;

(E) a fourth spool passage between the tank galley and the second hydraulic port associated with the spool, that is capable of being opened or closed depending upon the position of the spool;

(F) a fifth spool passage, wherein the open center core passes through the fifth spool passage, and wherein, depending upon the position of the spool, the spool may permit hydraulic fluid to flow through the fifth spool passage and the open center core in an unrestricted manner, or the spool may partially restrict the hydraulic fluid flowing through the fifth spool passage and the open center core;

(24) wherein each spool of the second set of spools has associated therewith:

(A) a first hydraulic port and a second hydraulic port;

(B) a first spool passage between the second power core and the first hydraulic port associated with the spool, that is capable of being opened or closed depending upon the position of the spool;

(C) a second spool passage between the second power core and the second hydraulic port associated with the spool, that is capable of being opened or closed depending upon the position of the spool;

(D) a third spool passage between the tank galley and the first hydraulic port associated with the spool, that is capable of being opened or closed depending upon the position of the spool;

(E) a fourth spool passage between the tank galley and the second hydraulic port associated with the spool, that is capable of being opened or closed depending upon the position of the spool;

(F) a fifth spool passage, wherein the open center core passes through the fifth spool passage, and wherein, depending upon the position of the spool, the spool may permit hydraulic fluid to flow through the fifth spool passage and the open center core in an unrestricted manner, or the spool may partially restrict the hydraulic fluid flowing through the fifth spool passage and the open center core;

(25) wherein each spool of the third set of spools has associated therewith:

(A) a first hydraulic port and a second hydraulic port;

(B) a first spool passage between the third power core and the first hydraulic port associated with the spool, that is capable of being opened or closed depending upon the position of the spool;

(C) a second spool passage between the third power core and the second hydraulic port associated with the spool, that is capable of being opened or closed depending upon the position of the spool;

(D) a third spool passage between the tank galley and the first hydraulic port associated with the spool, that is capable of being opened or closed depending upon the position of the spool;

(E) a fourth spool passage between the tank galley and the second hydraulic port associated with the spool, that is capable of being opened or closed depending upon the position of the spool;

(F) a fifth spool passage, wherein the open center core passes through the fifth spool passage, and wherein, depending upon the position of the spool, the spool may permit hydraulic fluid to flow through the fifth spool passage and the open center core in an unrestricted manner, or the spool may partially restrict the hydraulic fluid flowing through the fifth spool passage and the open center core;

(26) wherein each spool in the first set of spools has at least a neutral position, a first non-neutral position, and a second non-neutral position, wherein each such spool in the first set of spools operates in the following manner:

(A) in the neutral position, the spool permits hydraulic fluid to flow through the fifth spool passage and the open center core passing therethrough in an unrestricted manner, and the spool blocks the flow of hydraulic fluid through the first spool passage, the second spool passage, the third spool passage, and the fourth spool passage;

(B) in the first non-neutral position, the spool partially restricts the flow of hydraulic fluid through the fifth spool passage and the open center core passing therethrough, the partial restriction causes hydraulic fluid in the open center core upstream of the partial restriction to increase in pressure, the hydraulic fluid under pressure is conducted through the first open center/power core passage into the first power core, the spool opens the first spool passage between the first power core and the first hydraulic port associated with the spool allowing hydraulic fluid under pressure to flow from the first power core to the first hydraulic port associated with the spool, the spool opens the fourth spool passage between the tank galley and the second hydraulic port associated with the spool allowing hydraulic fluid to flow from the second hydraulic port associated with the spool to the tank galley, the spool closes the second spool passage between the first power core and the second hydraulic port associated with the spool, and the spool closes the third spool passage between the tank galley and the first hydraulic port associated with the spool; and (C) in the second non-neutral position, the spool partially restricts the flow of hydraulic fluid through the fifth spool passage and the open center core passing therethrough, the partial restriction causes hydraulic fluid in the open center core upstream of the partial restriction to increase in pressure, the hydraulic fluid under pressure is conducted through the first open center/power core passage into the first power core, the spool opens the second spool passage between the first power core and the second hydraulic port associated with the spool allowing hydraulic fluid under pressure to flow from the first power core to the second hydraulic port associated with the spool, the spool opens the third spool passage between the tank galley and the first hydraulic port associated with the spool allowing hydraulic fluid to flow from the first hydraulic port associated with the spool to the tank galley, the spool closes the first spool passage between the first power core and the first hydraulic port associated with the spool, and the spool closes the fourth spool passage between the tank galley and the second hydraulic port associated with the spool;

(27) wherein each spool in the second set of spools has at least a neutral position, a first non-neutral position, and a second non-neutral position, wherein each such spool in the second set of spools operates in the following manner:

(A) in the neutral position, the spool permits hydraulic fluid to flow through the fifth spool passage and the open center core passing therethrough in an unrestricted manner, and the spool blocks the flow of hydraulic fluid through the first spool passage, the second spool passage, the third spool passage, and the fourth spool passage;

(B) in the first non-neutral position, the spool partially restricts the flow of hydraulic fluid through the fifth spool passage and the open center core passing therethrough, the partial restriction causes hydraulic fluid in the open center core upstream of the partial restriction to increase in pressure, the hydraulic fluid under pressure is conducted through the second open center/power core passage into the second power core, the spool opens the first spool passage between the second power core and the first hydraulic port associated with the spool allowing hydraulic fluid under pressure to flow from the second power core to the first hydraulic port associated with the spool, the spool opens the fourth spool passage between the tank galley and the second hydraulic port associated with the spool allowing hydraulic fluid to flow from the second hydraulic port associated with the spool to the tank galley, the spool closes the second spool passage between the second power core and the second hydraulic port associated with the spool, and the spool closes the third spool passage between the tank galley and the first hydraulic port associated with the spool; and (C) in the second non-neutral position, the spool partially restricts the flow of hydraulic fluid through the fifth spool passage and the open center core passing therethrough, the partial restriction causes hydraulic fluid in the open center core upstream of the partial restriction to increase in pressure, the hydraulic fluid under pressure is conducted through the second open center/power core passage into the second power core, the spool opens the second spool passage between the second power core and the second hydraulic port associated with the spool allowing hydraulic fluid under pressure to flow from the second power core to the second hydraulic port associated with the spool, the spool opens the third spool passage between the tank galley and the first hydraulic port associated with the spool allowing hydraulic fluid to flow from the first hydraulic port associated with the spool to the tank galley, the spool closes the first spool passage between the second power core and the first hydraulic port associated with the spool, and the spool closes the fourth spool passage between the tank galley and the second hydraulic port associated with the spool;

(28) wherein each spool in the third set of spools has at least a neutral position, a first non-neutral position, and a second non-neutral position, wherein each such spool in the third set of spools operates in the following manner:

(A) in the neutral position, the spool permits hydraulic fluid to flow through the fifth spool passage and the open center core passing therethrough in an unrestricted manner, and the spool blocks the flow of hydraulic fluid through the first spool passage, the second spool passage, the third spool passage, and the fourth spool passage;

(B) in the first non-neutral position, the spool partially restricts the flow of hydraulic fluid through the fifth spool passage and the open center core passing therethrough, the partial restriction causes hydraulic fluid in the open center core upstream of the partial restriction to increase in pressure, the hydraulic fluid under pressure is conducted through the third open center/power core passage into the third power core, the spool opens the first spool passage between the third power core and the first hydraulic port associated with the spool allowing hydraulic fluid under pressure to flow from the third power core to the first hydraulic port associated with the spool, the spool opens the fourth spool passage between the tank galley and the second hydraulic port associated with the spool allowing hydraulic fluid to flow from the second hydraulic port associated with the spool to the tank galley, the spool closes the second spool passage between the third power core and the second hydraulic port associated with the spool, and the spool closes the third spool passage between the tank galley and the first hydraulic port associated with the spool; and (C) in the second non-neutral position, the spool partially restricts the flow of hydraulic fluid through the fifth spool passage and the open center core passing therethrough, the partial restriction causes hydraulic fluid in the open center core upstream of the partial restriction to increase in pressure, the hydraulic fluid under pressure is conducted through the third open center/power core passage into the third power core, the spool opens the second spool passage between the third power core and the second hydraulic port associated with the spool allowing hydraulic fluid under pressure to flow from the third power core to the second hydraulic port associated with the spool, the spool opens the third spool passage between the tank galley and the first hydraulic port associated with the spool allowing hydraulic fluid to flow from the first hydraulic port associated with the spool to the tank galley, the spool closes the first spool passage between the third power core and the first hydraulic port associated with the spool, and the spool closes the fourth spool passage between the tank galley and the second hydraulic port associated with the spool;

(29) wherein each of the spools have one or more spool actuators that cause or allow the spool to be in a neutral position, a first non-neutral position, or a second non-neutral position; and

(30) wherein:

(A) the first hydraulic port of the first spool and the first hydraulic port of the third spool are hydraulically connected;

(B) the second hydraulic port of the first spool and the second hydraulic port of the third spool are hydraulically connected; and (C) wherein the spool actuators for the first spool and the spool actuators for the third spool are commonly activated, such that:

(i) when the first spool is caused or allowed to be in a neutral position, then the third spool is also caused or allowed to be in a neutral position;

(ii) when the first spool is caused or allowed in a first non-neutral position, then the third spool is also caused to be in a first non-neutral position; and (iii) when the first spool is caused or allowed to be in a second non-neutral position, then the third spool is also caused to be in a second non-neutral position.

3. A smart flow sharing system for operating hydraulic equipment including first, second, and third hydraulic cylinders for actuating the hydraulic equipment, the smart flow sharing system comprising:

first and second fixed displacement pumps;

first, second, and third sets of hydraulic ports for supplying fluid flow to the first, second, and third hydraulic cylinders, respectively;

an open core for receiving fluid from the first and second displacement pumps; and first, second, third, and fourth spools, wherein the first, second, third, and fourth spools are connected in series via the open core;

the first, second, and third spools for directing fluid flow to the first, second, and third sets of hydraulic ports, respectively, and the fourth spool for directing fluid flow to the second or third set of hydraulic ports;

the first and fourth spools for receiving fluid flow from the first displacement pump; and the second and third spools for receiving fluid flow from the first and second displacement pumps;

wherein the second or third set of hydraulic ports is configured to receive fluid flow from the second or third spool, respectively, and from the fourth spool.

4. The smart flow sharing system of claim 3, wherein the third set of hydraulic ports is configured to receive fluid flow from the third and fourth spools.

5. The smart flow sharing system of claim 4, wherein restriction of fluid flow to the third set of hydraulic ports from the third spool causes the third set of hydraulic ports to receive a majority of fluid flow from the fourth spool.

6. The smart flow sharing system of claim 3, wherein restriction of fluid flow to the second spool from the first displacement pump cause the second spool to receive a majority of fluid flow from the second displacement pump.

7. The smart flow sharing system of claim 3, wherein first, second, third, and fourth sets of actuators are communicatively coupled to the first, second, third, and fourth spools, respectively, each of the first, second, third, and fourth sets of actuators for causing the respective spool:

(a) to allow unrestricted fluidic communication between the first, second, third, and fourth spools via the open core, or (b) to restrict fluidic communication through the open core, thereby directing fluid flow to the set of hydraulic ports receiving fluid flow from the respective spool.

8. The smart flow sharing system of claim 7, wherein a common controller controls the third and fourth sets of actuators, wherein the third set of hydraulic ports is configured to receive fluid flow from each of the third and fourth spools.

9. The smart flow sharing system of claim 8, wherein the controller is a two-axis joystick.

10. The smart flow sharing system of claim 3, wherein the fourth spool is fluidically coupled to the open core upstream of the first spool, the first spool is fluidically coupled to the open core upstream of the second spool, the second spool is fluidically coupled to the open core upstream of the third spool, and the third spool is fluidically coupled to the open core downstream of the second spool.

11. The smart flow sharing system of claim 3, further comprising first, second, and third power cores for supplying fluid flow to the first, second, and third spools, respectively, the first power core also for supplying fluid flow to the fourth spool, wherein the first, second, and third power cores supply fluid flow from at least one of the first and second displacement pumps.

12. The smart flow sharing system of claim 3, wherein the first, second, third, and fourth spools are configured to function in three positions, the first position for allowing unrestricted fluidic communication between the displacement pumps and a fluid tank, and the second and third positions for restricting fluidic communication between the first and second displacement pumps and the tank, and the second and third positions for allowing fluidic communication between the spool and the set of hydraulic ports receiving fluid flow from the spool.

13. The smart flow sharing system of claim 3, wherein each spool of the first, second, third, and fourth spools allows for fluidic communication to a tank from the set of hydraulic ports receiving fluid flow from the spool.

14. A smart flow sharing system for operating hydraulic equipment including first, second, and third hydraulic cylinders for actuating the hydraulic equipment, the smart flow sharing system comprising:

first and second fixed displacement pumps for pumping fluid from a fluid tank;

a tank galley for supplying fluid flow to the fluid tank;

first, second, and third sets of hydraulic ports for supplying fluid flow to the first, second, and third hydraulic cylinders, respectively;

first, second, and third spools for directing fluid flow to the first, second, and third sets of hydraulic ports, respectively;

a fourth spool for directing fluid flow to the second or third set of hydraulic ports;

an open core for supplying fluid flow from the first and second displacement pumps and for providing fluidic communication between each of the first, second, third, and fourth spools, wherein the first, second, third, and fourth spools are connected in series via the open core; and first, second, and third power cores for supplying fluid flow to the first, second, and third spools, respectively, the first power core also for supplying fluid flow to the fourth spool, wherein the first, second, and third power cores supply fluid flow from at least one of the first and second displacement pumps;

wherein the first power core supplies fluid flow from the first displacement pump and is fluidically coupled to the open core via a first passage;

wherein the second power core supplies fluid flow from the first and second displacement pumps and is fluidically coupled to each of the open core and the second displacement pump via a second passage, the second passage providing for fluidic communication between the open core and second displacement pump;

wherein the third power core supplies fluid flow from the first and second displacement pumps and is fluidically coupled to the open core via a third passage.

15. The smart flow sharing system of claim 14, wherein the third and fourth spools direct fluid flow to the third set of hydraulic ports.

16. The smart flow sharing system of claim 15, wherein restriction of fluid flow to the third set of hydraulic ports from the third spool causes the third set of hydraulic ports to receive a majority of flow from the fourth spool.

17. The smart flow sharing system of claim 14, wherein restriction of fluid flow to the second spool from the first displacement pump causes the second spool to receive a majority of flow from the second displacement pump.

18. The smart flow sharing system of claim 14, wherein the fourth spool is fluidically coupled to the open core upstream of the first spool, the first spool is fluidically coupled to the open core upstream of the second spool, the second spool is fluidically coupled to the open core upstream of the third spool, and the third spool is fluidically coupled to the open core downstream of the second spool.

19. The smart flow sharing system of claim 14, wherein the first power core is fluidically coupled to the open core upstream of the spools, the second power core is fluidically coupled to the open core downstream of the first and fourth spools and upstream of the second and third spools, and the third power core is fluidically coupled to the open core downstream of the first, second, and fourth spools and upstream of the third spool.

20. The smart flow sharing system of claim 14, wherein each spool of the first, second, third, and fourth spools controls fluidic communication between the set of hydraulic ports receiving fluid flow from the spool, the power core associated with the spool, the tank galley, and the open core.

* * * * *